(12) United States Patent
Ambrosina et al.

(10) Patent No.: US 6,668,642 B2
(45) Date of Patent: *Dec. 30, 2003

(54) APPARATUS AND METHOD FOR THERMAL ISOLATION OF THERMAL MASS FLOW SENSOR

(75) Inventors: Jesse Ambrosina, Topsfield, MA (US); Isao Suzuki, Suginami-Ku (JP)

(73) Assignee: MKS Instruments, Inc., Andover, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/032,273

(22) Filed: Dec. 21, 2001

(65) Prior Publication Data

US 2003/0115951 A1 Jun. 26, 2003

(51) Int. Cl.$^7$ .............................. G01F 1/68; G01F 5/00
(52) U.S. Cl. ........................................ 73/202.5; 73/202
(58) Field of Search ................... 73/202, 202.5, 73/861.52, 861.51, 204.17, 204.19, 204.21, 861.63, 861.64

(56) References Cited

U.S. PATENT DOCUMENTS

| | | | |
|---|---|---|---|
| 3,851,526 A | 12/1974 | Drexel | 73/202 |
| 3,938,384 A | 2/1976 | Blair | 73/202.5 |
| 4,464,932 A | 8/1984 | Ewing et al. | 73/202.5 |
| 4,519,246 A | 5/1985 | Hartemink | 73/202.5 |
| 4,548,075 A | 10/1985 | Mariano | 73/202 |
| 5,279,154 A * | 1/1994 | Vavra et al. | 73/202.5 |
| 5,461,913 A | 10/1995 | Hinkle et al. | 73/204.25 |
| 5,792,952 A | 8/1998 | Ritchart | 73/204.27 |
| 5,803,507 A | 9/1998 | Vu | 285/23 |
| 5,804,717 A | 9/1998 | Lucas | 73/202 |
| 6,038,921 A | 3/2000 | McMillan et al. | 73/204.23 |
| 6,044,701 A | 4/2000 | Doyle et al. | 73/202.5 |
| 6,062,077 A | 5/2000 | Azima | 73/202.5 |

* cited by examiner

Primary Examiner—Harshad Patel
(74) Attorney, Agent, or Firm—McDermott, Will & Emery

(57) ABSTRACT

A thermal mass flow controller includes a sensor assembly and mass flow controller housing. A thermal ground limits the conductive thermal path between the mass flow controller housing and the sensor assembly and, due to the limited cross-section of the thermal ground, substantially eliminates externally imposed thermal gradients within the sensor assembly.

20 Claims, 3 Drawing Sheets

APPARATUS AND METHOD FOR THERMAL ISOLATION OF THERMAL MASS FLOW SENSOR

RELATED APPLICATIONS

Patent applications entitled, "Method and Apparatus For Thermal Dissipation In A Thermal Mass Flow Sensor", having inventors, Jesse Ambrosina and Ali Shajii, (Attorney Docket No. MKS-93), and "Apparatus and Method For Thermal Management of A Mass Flow Controller", having inventors, Jesse Ambrosina, Isao Suzuki and Ali Shajii, (Docket No. MKS-94) assigned to the same assignee as this application and filed on even date herewith are hereby incorporated by reference in their entirety.

FIELD OF THE INVENTION

The present invention relates to mass flow measuring systems and, more particularly, to mass flow sensor housings that substantially eliminate thermal gradients that might otherwise be imposed upon a mass flow sensor.

BACKGROUND OF THE INVENTION

Capillary tube thermal mass flow sensors exploit the fact that heat transfer to a fluid flowing in a laminar tube from the tube walls is a function of mass flow rate of the fluid, the difference between the fluid temperature and the wall temperature, and the specific heat of the fluid. Mass flow controllers employ a variety of mass flow sensor configurations. For example, one type of construction involves a stainless steel flow tube with two or more resistive elements in thermally conductive contact with the sensor tube. The resistive elements are typically composed of a material having a high temperature coefficient of resistance. Each of the elements can act as a heater, a detector, or both. One or more of the elements is energized with electrical current to supply heat to the fluid stream through the tube. If the heaters are supplied with constant current, the rate of fluid mass flow through the tube can be derived from temperature differences in the elements. Fluid mass flow rates can also be derived by varying the current through the heaters to maintain a constant temperature profile.

Such thermal mass flow sensors may be attached to a mass flow controller, with fluid from the controller's bypass tube feeding the capillary tube (also referred to herein as the sensor tube). Since mass flow measurements are dependent upon the temperature effects of the fluid upon the resistive elements, any external differential temperature imparted to the resistive elements could produce errors in the measurement of a mass flow rate. Unfortunately, thermal mass flow sensors are frequently operated in environments where an external thermal gradient might be imposed upon them. For example, a thermal mass flow sensor may be operated in close proximity to a valve coil that dissipates significant power as it operates. Heat generated from operation of the valve coil may be communicated through a conductive thermal path, such as that provided by a mass flow controller housing, to the mass flow sensor. The heat thus-communicated may impose a thermal gradient upon the mass flow sensor housing which could, in turn, superimpose the external thermal gradient upon the sensor's resistive elements, thus leading to errors in mass flow measurements.

A mass flow sensor that substantially eliminates externally imposed thermal gradients would therefore be highly desirable.

SUMMARY OF THE INVENTION

In a mass flow sensor in accordance with the principles of the present invention a mass flow sensor housing is attached to a mass flow controller through a baseplate. The mass flow sensor includes a mass flow sensor tube oriented along a predetermined axis within the mass flow sensor housing. The baseplate may be integral to the sensor housing or it may be attached to the housing through any of a variety of attachment means, such as threaded through-holes and bolts, for example. The baseplate is configured to provide a thermal path between the mass flow controller and the sensor to thereby maintain the sensor and controller housings at substantially the same average temperature. Additionally, the thermal path provided by the baseplate is configured to substantially reduce or eliminate thermal gradients which might otherwise be imposed upon the mass flow sensor housing through thermally conductive contact with the mass flow controller housing.

In an illustrative embodiment a sensor housing establishes a thermal ground between the mass flow sensor housing and the mass flow controller housing. The thermal ground features a cross-sectional area that is significantly less than the cross sectional footprint of the sensor housing. The cross-section of the thermal ground may have a circular, rectangular or other geometrical shape. The thermal ground provides a thermal path that is sufficient to maintain the overall average temperatures of the mass flow sensor housing and the mass flow controller housing at substantially the same level. Additionally, the thermal ground is located in an area of the sensor housing substantially coincident with the midpoint of the flow sensor tube. The thermal path created by the thermal ground is sufficient to maintain the average temperatures of the sensor housing and mass flow controller housing substantially equal.

The permissible lag time between a change in the average temperature of the mass flow controller housing and a corresponding change in the average temperature of the mass flow sensor housing is a design choice that will affect the accuracy of mass flow readings. Given a permissible lag time (for given a temperature shift), a corresponding thermal flow figure may be computed. The thermal flow figure may then be used to determine the thermal conductivity and cross sectional area required for the thermal ground material. To minimize the possibility of the establishment of thermal gradients across the flow sensor housing, the cross sectional area of the thermal ground is minimized. That is, for a convenient structural material, such as Aluminum, the cross sectional area of the thermal ground must be large enough to eliminate temperature differentials between the thermal mass flow sensor housing and the thermal mass flow controller housing, yet small enough to prevent the establishment of thermal gradients across the cross-section of the thermal ground.

In an illustrative embodiment, a mass flow sensor housing includes thermal ground having a rectangular cross section. The thermal ground is oriented orthogonal to the axis of the flow sensor tube, and is positioned substantially midway between the sensor tube input and output apertures. A mass flow sensor housing in accordance with the principles of the present invention is particularly well suited for use with a mass flow sensor such as a differential current thermal mass flow transducer. The thermal ground may be formed in a way that permits relatively easy adjustment of the thermal ground's position relative to the mass flow sensor. In such an embodiment the position of the mass flow sensor may be adjusted to "zero out" the effect of a mass flow sensor's thermal clamp.

These and other advantages of the present disclosure will become more apparent to those of ordinary skill in the art after having read the following detailed descriptions of the preferred embodiments, which are illustrated in the attached drawing figures. For convenience of illustration, elements within the Figures may not be drawn to scale.

DETAILED DESCRIPTION OF DISCLOSURE

A mass flow controller in accordance with the principles of the present invention includes a mass flow sensor assembly and a valve assembly. In an illustrative embodiment, the mass flow sensor assembly is attached to the mass flow controller housing and includes a thermal ground configured to substantially minimize thermal gradients between the mass flow controller housing and the mass flow sensor. The thermal ground is also configured to minimize externally imposed thermal gradients along the mass flow sensor. The thermal ground features a cross-sectional area that is significantly less than the cross sectional footprint of the sensor housing. The cross-section of the thermal ground may have a circular, rectangular or other geometrical shape. The thermal ground provides a thermal path that is sufficient to maintain the overall average temperatures of the mass flow sensor housing and the mass flow controller housing at substantially the same level. Additionally, the thermal ground is located in an area of the sensor housing substantially coincident with the midpoint of the flow sensor tube.

Figure 1:
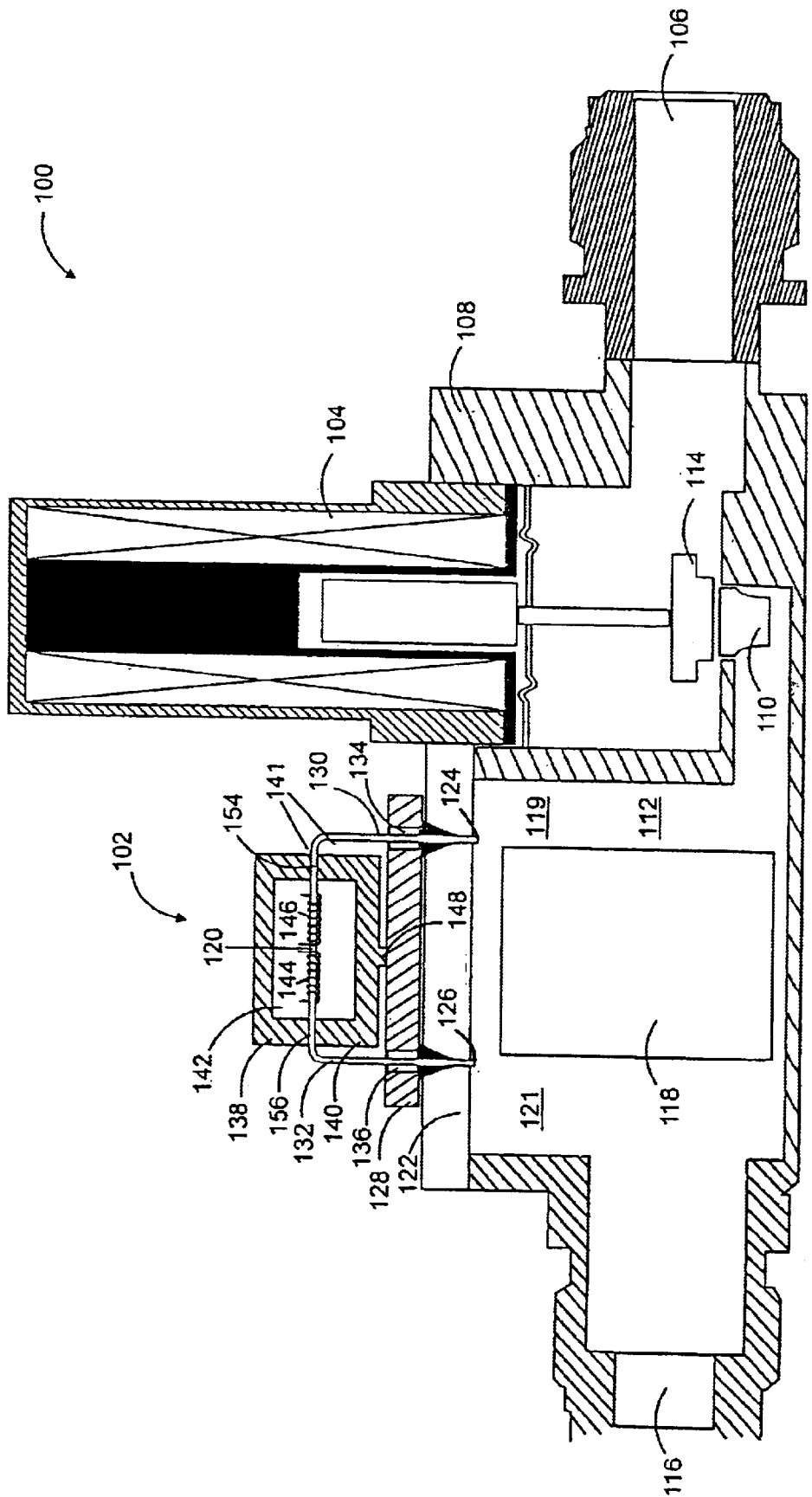
FIG. 1 is a sectional drawing of a mass flow controller in accordance with the principles of the present invention that employs a thermal ground between a mass flow sensor assembly and the mass flow controller housing.

The sectional view of FIG. 1 illustrates the major components of a mass flow controller in accordance with the principles of the present invention. The mass flow controller 100 includes a thermal mass flow sensor assembly 102 and a valve assembly 104. The valve assembly 104 is connected to the mass flow controller housing 108 to control the rate of flow of gas in response to control signals generated by a mass flow sensor circuitry described generally in the discussion related to FIG. 2. The mass flow controller 100 includes an inlet 106 for receiving a flow of gases to be metered. The process gas enters the mass flow controller though the inlet 106 and travels through the valved opening 110 to a bypass channel 112. The valve 114 operates under control of the mass flow sensor and related circuitry to admit a precisely measured quantity of process gas into the inlet port 106, through the controller, and out the outlet port 116 for a processing application, such as may be employed in integrated circuit manufacturing. The bypass channel 112 is connected to the inlet port 106 to receive and carry the stream of gas.

A laminar flow element 118 rests within the channel 112 and provides a pressure drop across the thermal mass flow sensor 102 and drives a portion of the gas through the sensor tube 120 of the thermal mass flow sensor 102. The mass flow sensor includes circuitry that senses the rate of flow of gas through the controller 100 and controls operation of the valve assembly 114. The mass flow sensor assembly 102 is attached to a wall 122 of the mass flow controller that forms a boundary of the bypass channel 112. Input 124 and output 126 apertures in the wall 122 provide access to the mass flow sensor assembly 102 for a gas travelling through the mass flow controller 100. In this illustrative embodiment the mass flow sensor assembly 102 includes a baseplate 128 for attachment to the wall 122. The baseplate 128 may be attached to the wall and to the remainder of the sensor assembly using threaded hole and mating bolt combinations, for example. Input 130 and output 132 legs of the sensor tube 120 extend through respective input 134 and output 136 apertures of the baseplate 128 and, through apertures 124 and 126, the mass flow controller wall 122.

The mass flow sensor assembly includes top 138 and bottom 140 sections that, when joined, form a thermal clamp 141 that holds both ends of the sensor tube active area (that is, the area defined by the extremes of resistive elements in thermal contact with the sensor tube) at substantially the same temperature. The thermal clamp also forms a chamber 142 around the active area of the sensor tube 120. That is, the segment of the mass flow sensor tube 120 within the chamber 142 has in thermal communication with it two or more resistive elements 144, 146, each of which may act as a heater, a detector, or both. One or more of the elements 144, 146 is energized with electrical current to supply heat to the fluid as it streams through the sensor tube 120.

The thermal clamp 141, which is typically fabricated from a material characterized by a high thermal conductivity relative to the thermal conductivity of the sensor tube 120, makes good thermally conductive contact with the portion of the sensor tube 120 just downstream from the resistive element 144 and with the portion of the sensor tube just upstream from the resistive element 146. The thermal clamp 141 thereby encloses and protects the resistive elements 144 and 146 and the sensor tube 120. Additionally, the thermal clamp 141 thermally "anchors" those portions of the sensor tube with which it makes contact at, or near, the ambient temperature. In order to eliminate even minute errors due to temperature differentials, the sensor tube may be moved within the thermal clamp to insure that any difference between the resistance of the two coils is due to fluid flow through the sensor tube; not to temperature gradients imposed upon the coils from the environment. In accordance with the principles of the present invention, the chamber that encloses the sensor tube 120, the thermal clamp 141 in this illustrative embodiment, makes contact with the mass flow controller-housing wall 122 through a thermal ground 148. The thermal ground may be formed, as illustrated, between the thermal clamp 141 and the baseplate 128 and/or between the baseplate 128 and the mass flow controller-housing wall 122, for example. The thermal ground may be integral to the controller-housing wall 122, to the baseplate 128, or to the thermal clamp 141, for example. Alternatively, the thermal ground may be a separately-formed thermally conductive element positioned between the thermal sensor assembly 102 and the controller housing 108.

Figure 2:
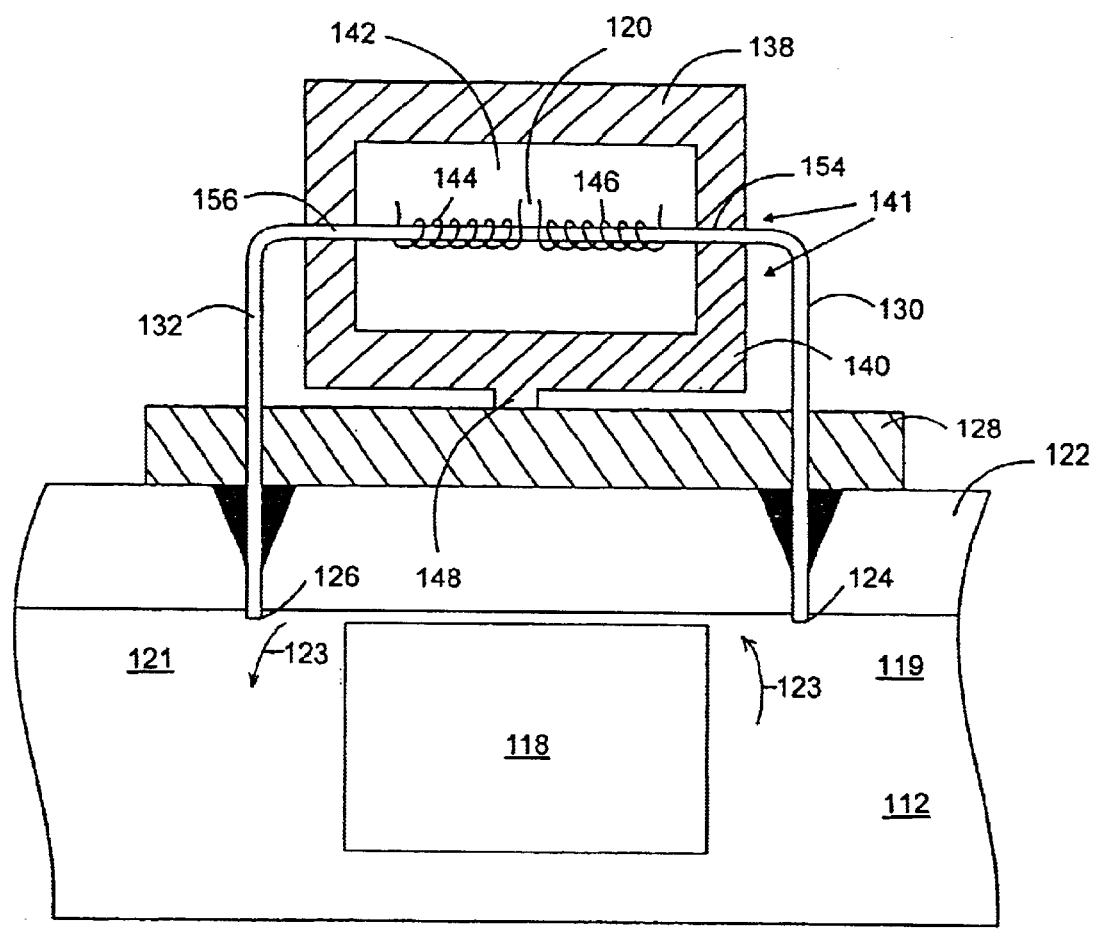
FIG. 2 is a partial conceptual block diagram and partial sectional drawing of a mass flow rate sensor assembly in accordance with the principles of the present invention.

FIG. 2 illustrates in greater detail an embodiment of a mass flow in accordance with the principles of the present invention. The bypass tube 120, laminar flow element 118, upstream resistive element 146 and downstream resistive element 144 are as previously described. The arrangement of the thermal clamp 141, including top 138 and bottom 140 portions, and its thermally conductive communication with the sensor tube 120 is illustrated in greater detail here. The broken lines of the sensor tube 120 indicate that the tube is substantially surrounded and in conductive thermal contact with the thermal clamp 141 around its entire circumference at each end of its operational segment. The operational segment of the sensor tube is defined for illustrative purposes as that segment of the sensor tube disposed between the upstream 154 and downstream 156 legs of the thermal clamp.

One end 119 of the bypass tube 112 defines an input port 119 and the other end of the bypass tube 112 defines an output port 121 so that fluid may flow from the input port 119 to the output port 121 in a downstream direction indicated by arrows 123. The laminar flow element 118 is disposed within the bypass tube 112 for restricting the flow of fluid through the tube. An upstream end of the sensor tube 120 couples to the bypass tube 112 between the input port 119 and the laminar flow element. A downstream end of the sensor tube 120 couples to the bypass tube 112 between the laminar flow element 118 and the output port 121, a fixed proportion of the total mass of fluid flowing from the input port 119 to the output port 121 flows through the sensor tube 120. The sensor tube 120 may be of capillary dimensions and is fabricated from a material, such as steel, that is characterized by a relatively high thermal conductivity in comparison to the thermal conductivity of the fluid.

Each of the resistive elements 144 and 146 includes a thermally sensitive resistive conductor that is wound around a respective portion of the sensor tube 120, each successive turn of the conductors being placed close to the previous turn. Each of the resistive elements extends along respective portions of the sensor tube 120 along an axis defined by the operational segment of the sensor tube 120. Downstream resistive element 144 is disposed downstream of the resistive element 146. The elements abut one another or are separated by a small gap for manufacturing convenience and are electrically connected at the center of the sensor tube 120. Each resistive element 144, 146 provides an electrical resistance that varies as a function of its temperature. The temperature of each resistive element varies as a function of the electrical current flowing through its resistive conductor and the mass flow rate within the sensor tube 120. In this way, each of the resistive elements 144, 146 operates as both a heater and a sensor. That is, the element acts as a heater that generates heat as a function of the current through the element and, at the same time, the element acts as a sensor, allowing the temperature of the element to be measured as a function of its electrical resistance. The mass flow sensor 102 may employ any of a variety of electronic circuits, typically in a Wheatstone bridge arrangement, to apply energy to the resistive elements 146 and 144, to measure the temperature dependent resistance changes in the element and, thereby, the mass flow rate of fluid passing through the tube 120. Circuits employed for this purpose are disclosed, for example, in U.S. Pat. No. 5,461,913, issued to Hinkle et al and U.S. Pat. No. 5,410,912 issued to Suzuki, both of which are hereby incorporated by reference in their entirety.

In operation, fluid flows from the input port 119 to the output port 121 and a portion of the fluid flows through the restrictive laminar flow element 118. The remaining fluid flows through the sensor tube 120. The circuit (not shown) causes an electrical current to flow through the resistive elements 144 and 146 so that the resistive elements 144 and 146 generate and apply heat to the sensor tube 120 and, thereby, to the fluid flowing through the sensor tube 120. Because the upstream resistive element 146 transfers heat to the fluid before the fluid reaches the portion of the sensor tube 120 enclosed by the downstream resistive element 144, the fluid conducts more heat away from the upstream resistive element 146 than it does from the downstream resistive element 144. The difference in the amount of heat conducted away from the two resistive elements is proportional to the mass flow rate of fluid within the sensor tube 120 and, by extension, the total mass flow rate through the mass flow rate controller from the input port through the output port. The circuit measures this difference by sensing the respective electrical resistances and generates an output signal that is representative of the mass flow rate through the sensor tube 120.

The baseplate 128 may be integral to the sensor assembly 102 or it may be attached to the sensor assembly 102 through any of a variety of attachment means, such as threaded through-holes and bolts, for example. The baseplate 128 is configured to provide a thermal path between the sensor assembly 102 and the remainder of the mass flow controller 100 and to thereby maintain the average temperature of the sensor assembly 102 and the remainder of the mass flow controller at substantially the same average temperature. Additionally, the thermal path provided by the baseplate, through use of the thermal ground 148, is configured to substantially reduce or eliminate thermal gradients which might otherwise be imposed upon the mass flow sensor assembly through thermally conductive contact with the mass flow controller housing.

In particular, the thermal ground 148 features a cross-sectional area that is significantly less than the cross sectional footprint of the sensor assembly 102 at base plate 128. The cross-section of the thermal ground 148 may have a circular, rectangular or other geometrical shape. The thermal ground provides a thermal path that is sufficient to maintain the overall average temperatures of the mass flow sensor assembly and the remainder of the mass flow controller at substantially the same level.

In this illustrative embodiment, the thermal ground 148 is located in an area of the sensor assembly that is substantially coincident with the midpoint of the flow sensor tube 120 and orthogonal to the axis of the sensor tube 120. The position is chosen to ensure that no thermal gradient is imposed upon the sensor tube 120. However, other positioning arrangements are contemplated within the scope of the invention. For example, as described in greater detail in U.S. Pat. No. 5,693,880 issued to Maginnis, Jr., which is hereby incorporated by reference in its entirety, the accuracy of a thermal flow sensor may be sensitive to the position of the tube/resistive element assembly with respect to the thermal clamp legs 156 and 154. In an illustrative embodiment, rather than shifting the sensor tube 120 in an effort at thermal balancing, the thermal ground 148 may be positioned to "zero out" minor differences due to positioning issues relative to the thermal clamp, such as discussed in U.S. Pat. No. 5,693,880. In order to facilitate such balancing, the thermal ground 148 may include a captive shim, including one or more slots for sliding attachment of the ground 148 to the lower section 140 of the thermal clamp 141 or to the baseplate 128, for example.

One measure of the effectiveness of the thermal ground at keeping the average temperature of the sensor assembly at substantially the same average temperature as the remainder of the mass flow controller is the lag time between a change in the average temperature of the controller and a corresponding change in the average temperature of the mass flow sensor assembly 102. The permissible lag time is a design choice that may affect the accuracy of mass flow readings. Given a permissible lag time (for given a temperature shift), a corresponding thermal flow figure may be computed. The thermal flow figure may then be used to determine the thermal conductivity and cross sectional area required for the thermal ground material. To minimize the possibility of the establishment of thermal gradients across the flow sensor housing 108, the cross sectional area of the thermal ground is minimized. That is, for a convenient structural material, such as Aluminum, the cross sectional area of the thermal ground must be large enough to eliminate temperature differentials between the thermal mass flow sensor assembly 102 and the thermal mass flow controller housing 108, yet small enough to prevent the establishment of thermal gradients across the cross-section of the thermal ground. In an illustrative embodiment, the ratio of cross sectional areas of the sensor assembly and thermal ground is at least two to one.

Figure 3:
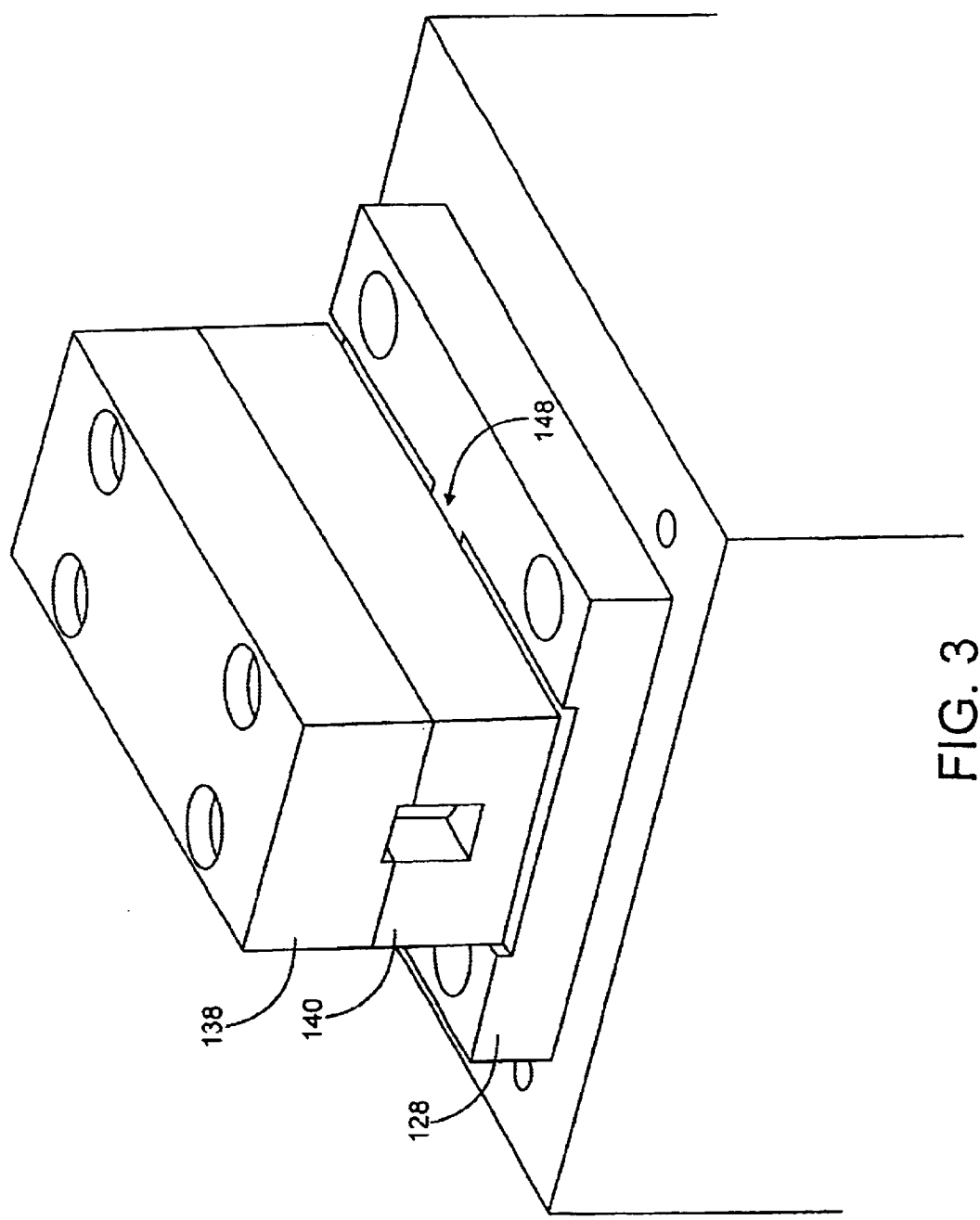
FIG. 3 is a perspective view of the exterior of a mass flow controller assembly in accordance with the principles of the present invention.

The perspective view of FIG. 3 provides a more detailed exterior view of the sensor assembly 102. In this illustrative embodiment, the thermal ground 148 is of a rectangular cross-section orthogonal to the axis of the sensor tube and has been formed in the baseplate 128.

While there have been illustrated and described particular embodiments of the present disclosure, it will be appreciated that numerous changes and modifications will occur to those skilled in the art. Accordingly, it is intended that the appended claims cover all those changes and modifications which fall within the true spirit and scope of the present disclosure.

What is claimed is:

1. A thermal mass flow controller comprising:
   a thermal mass flow controller housing including a fluid input port and a fluid output port and a bypass channel disposed between the input and output ports;
   a thermal mass flow sensor assembly operatively coupled to the thermal mass flow controller housing for measuring a flow of fluid through the bypass channel, the thermal mass flow sensor assembly including a sensor housing enclosing a mass flow sensor tube, a mounting portion coupled to the thermal mass flow controller housing and a thermal ground device coupled between the sensor housing and the mounting portion for providing a solitary thermal conductive path between the sensor housing and the mounting portion.

2. The thermal mass flow controller of claim 1 wherein the sensor housing has a first dimension and the thermal ground device couples the sensor housing to the mounting portion proximate a midpoint of the first dimension.

3. The thermal mass flow controller of claim 2 wherein the first dimension is a longitudinal dimension.

4. The thermal mass flow controller of claim 3, wherein the thermal ground device has a width dimension which is in a same plane as the longitudinal dimension of the sensor housing, and wherein the width dimension of the thermal ground device is less than the longitudinal dimension of the sensor housing.

5. The thermal mass flow controller of claim 2 wherein the thermal ground device has a width dimension in a same plane as the first dimension of the sensor housing, and wherein the width dimension of the thermal ground device is less than the first dimension of the sensor housing.

6. The thermal mass flow controller of claim 1 wherein the sensor housing forms a cavity around an operational portion of the mass flow sensor tube, such that the sensor housing isolates the operational portion of the mass flow sensor tube from contact with the thermal ground device.

7. The thermal mass flow controller of claim 6 wherein the operational portion of the mass flow sensor tube includes first and second resistive coils wound around the mass flow sensor tube and wherein a distance between a midpoint of the first resistive coil and the thermal ground device is substantially equal to a distance between a midpoint of the second resistive coil and the thermal ground device.

8. A thermal mass flow controller comprising:
   a thermal mass flow controller housing including a fluid input port and a fluid output port and a bypass channel disposed between the input and output ports;
   a thermal mass flow sensor assembly operatively coupled to the thermal mass flow controller housing for measuring a flow of fluid through the bypass channel, the thermal mass flow sensor assembly including a sensor housing enclosing a mass flow sensor tube, a mounting portion coupled to the thermal mass flow controller housing and a thermal ground device coupled between an exterior portion of the sensor housing and the mounting portion for providing a solitary thermal conductive path between the sensor housing and the mounting portion.

9. The thermal mass flow controller of claim 8 wherein the sensor housing has a first dimension and the thermal ground device couples the sensor housing to the mounting portion proximate a midpoint of the first dimension.

10. The thermal mass flow controller of claim 9 wherein the first dimension is a longitudinal dimension.

11. The thermal mass flow controller of claim 10, wherein the thermal ground device has a width dimension which is in a same plane as the longitudinal dimension of the sensor housing, and wherein the width dimension of the thermal ground device is less than the longitudinal dimension of the sensor housing.

12. The thermal mass flow controller of claim 9 wherein the thermal ground device has a width dimension in a same plane as the first dimension of the sensor housing, and wherein the width dimension of the thermal ground device is less than the first dimension of the sensor housing.

13. The thermal mass flow controller of claim 8 wherein the sensor housing forms a cavity around an operational portion of the mass flow sensor tube, such that the sensor housing isolates the operational portion of the mass flow sensor tube from contact with the thermal ground device.

14. The thermal mass flow controller of claim 13 wherein the operational portion of the mass flow sensor tube includes first and second resistive coils wound around the mass flow sensor tube and wherein a distance between a midpoint of the first resistive coil and the thermal ground device is substantially equal to a distance between a midpoint of the second resistive coil and the thermal ground device.

15. A thermal mass flow controller comprising:
   a thermal mass flow controller housing including a fluid input port and a fluid output port and a bypass channel disposed between the input and output ports;
   a thermal mass flow sensor assembly operatively coupled to the thermal mass flow controller housing for measuring a flow of fluid through the bypass channel, the thermal mass flow sensor assembly including a sensor housing enclosing a mass flow sensor tube, a mounting portion coupled to the thermal mass flow controller housing and no more than one thermal ground device comprising a solitary structure coupled between the sensor housing and the mounting portion for providing a solitary thermal conductive path between the sensor housing and the mounting portion.

16. The thermal mass flow controller of claim 15 wherein the sensor housing has a first dimension and the thermal ground device couples the sensor housing to the mounting portion proximate a midpoint of the first dimension.

17. The thermal mass flow controller of claim 16 wherein the first dimension is a longitudinal dimension.

18. The thermal mass flow controller of claim 17, wherein the thermal ground device has a width dimension which is in a same plane as the longitudinal dimension of the sensor housing, and wherein the width dimension of the thermal ground device is less than the longitudinal dimension of the sensor housing.

19. The thermal mass flow controller of claim 15 wherein the sensor housing forms a cavity around an operational portion of the mass flow sensor tube, such that the sensor housing isolates the operational portion of the mass flow sensor tube from contact with the thermal ground device.

20. The thermal mass flow controller of claim 19 wherein the operational portion of the mass flow sensor tube includes first and second resistive coils wound around the mass flow sensor tube and wherein a distance between a midpoint of the first resistive coil and the thermal ground device is substantially equal to a distance between a midpoint of the second resistive coil and the thermal ground device.

* * * * *